(12) United States Patent
Jarvis et al.

(10) Patent No.: US 10,896,156 B2
(45) Date of Patent: Jan. 19, 2021

(54) FLEXIBLE SYNCHRONOUS FILE SYSTEM REPLICATION

(71) Applicant: Quantum Corporation, San Jose, CA (US)

(72) Inventors: Ben Jarvis, Mendota Heights, MN (US); Stephen Lord, Prior Lake, MN (US)

(73) Assignee: Quantum Corporation, San Jose, CA (US)

( * ) Notice: Subject to any disclaimer, the term of this patent is extended or adjusted under 35 U.S.C. 154(b) by 167 days.

(21) Appl. No.: 16/043,693

(22) Filed: Jul. 24, 2018

(65) Prior Publication Data

US 2019/0034453 A1    Jan. 31, 2019

Related U.S. Application Data

(60) Provisional application No. 62/537,230, filed on Jul. 26, 2017.

(51) Int. Cl.
*G06F 16/178* (2019.01)
*G06F 16/13* (2019.01)
*G06F 16/11* (2019.01)
*G06F 16/14* (2019.01)

(52) U.S. Cl.
CPC .......... *G06F 16/178* (2019.01); *G06F 16/113* (2019.01); *G06F 16/13* (2019.01); *G06F 16/148* (2019.01)

(58) Field of Classification Search
None
See application file for complete search history.

(56) References Cited

U.S. PATENT DOCUMENTS

| | | | |
|---|---|---|---|
| 8,572,048 B2 | 10/2013 | LaBerge | |
| 9,767,106 B1 | 9/2017 | Duggal et al. | |
| 2003/0158661 A1 | 8/2003 | Chen et al. | |
| 2003/0182301 A1 | 9/2003 | Patterson et al. | |
| 2004/0036688 A1 | 2/2004 | Cutlip | |
| 2007/0027940 A1 | 2/2007 | Lutz et al. | |
| 2007/0185938 A1* | 8/2007 | Prahlad | G06F 16/2365 |

(Continued)

OTHER PUBLICATIONS

Non-Final Office Action dated Nov. 13, 2017 for U.S. Appl. No. 14/956,553.

(Continued)

*Primary Examiner* — Hau H Hoang
(74) *Attorney, Agent, or Firm* — Eschweiler & Potashnik, LLC

(57) ABSTRACT

Embodiments include an apparatus for replicating a file system (FS) that stores a file in a first location in a first data storage device, the apparatus comprising a query circuit configured to generate a spatial query that identifies a primary directory tree in the FS, and to receive a response to the query from the FS, where the response identifies a range of the primary directory tree in which a changed file may be found; a scan filter circuit configured to generate a scan filter based on the response, where the scan filter defines a portion of the primary directory tree that is smaller than the primary directory tree to search for a changed file; and a replication circuit configured to scan the portion of the primary directory tree, and upon detecting a changed file, replicate the changed file from the first location to a different location.

20 Claims, 10 Drawing Sheets

(56) References Cited

U.S. PATENT DOCUMENTS

| | | |
|---|---|---|
| 2008/0021914 A1 | 1/2008 | Davies et al. |
| 2009/0063453 A1 | 3/2009 | Adler et al. |
| 2009/0187464 A1 | 7/2009 | Bai et al. |
| 2010/0049930 A1 | 2/2010 | Pershin et al. |
| 2010/0179959 A1 | 7/2010 | Shoens |
| 2010/0228130 A1 | 9/2010 | Chiang et al. |
| 2011/0066617 A1 | 3/2011 | Liu et al. |
| 2012/0317079 A1 | 12/2012 | Shoens |
| 2013/0268493 A1 | 10/2013 | Berman et al. |
| 2013/0311429 A1 | 11/2013 | Agetsuma et al. |
| 2014/0019413 A1 | 1/2014 | Braam et al. |
| 2014/0074787 A1 | 3/2014 | Berman et al. |
| 2014/0156610 A1 | 6/2014 | Akers et al. |
| 2014/0172793 A1* | 6/2014 | Stritzel ............... G06F 16/1756 707/634 |
| 2014/0330787 A1 | 11/2014 | Modukuri et al. |
| 2015/0074064 A1 | 3/2015 | Goldberg et al. |
| 2015/0112939 A1 | 4/2015 | Cantwell et al. |
| 2015/0127619 A1 | 4/2015 | Cantwell et al. |
| 2016/0041778 A1 | 2/2016 | Li et al. |
| 2017/0123933 A1* | 5/2017 | Gallagher ........... G06F 11/1451 |
| 2017/0161308 A1* | 6/2017 | Jarvis ................. G06F 16/2237 |

OTHER PUBLICATIONS

Notice of Allowance dated Jul. 24, 2018 for U.S. Appl. No. 14/956,553.

\* cited by examiner

FLEXIBLE SYNCHRONOUS FILE SYSTEM REPLICATION

CROSS-REFERENCE TO RELATED APPLICATION

This application claims the benefit of U.S. Provisional Patent Application No. 62/537,230, filed Jul. 27, 2017, which is incorporated herein by reference in its entirety.

BACKGROUND

A shared file system (FS) may store data. A shared FS may also fail. One approach to prevent data loss in the event of a FS failure is to maintain a complete backup of the FS. In the event of a failure, the FS may then be restored from the complete backup. An FS may be very large, containing petabytes of data in thousands or millions or more files, so merely maintaining a backup and restoring from the backup may be time consuming and impractical, especially in a production environment. Another approach to protecting a source FS beyond merely maintaining a backup is to periodically replicate data to a second FS on independent hardware, often located in a physically different location. Upon the primary or source FS failing, the system may "fail over" to the replica.

Maintaining the replica efficiently is a challenging problem in data storage and file system management. Changes to the FS that occur between the time of the most recent replication and a failure may result in permanently lost data. Thus, it is desirable that the time window between when a file changes on the source FS to when that change is propagated to the replica to be as small as possible. One naïve approach to maintaining the replica is to use brute force scanning. Brute force scanning involves, for every file in the primary FS, checking if an identical copy exists in the replica, and, if not, copying the file from the primary FS to the replica. However, when the size of a FS starts to grow to even small enterprise levels, brute force scanning may take several hours just to look at all the metadata in a FS. Indeed, just the list of changes to such a FS might even be too large to precompute and store in memory. This results in a window that is too large for user needs. Moreover, just to sustain a lag time of several hours in this situation requires constant scanning. Brute force scanning is expensive in its use of computational resources, including processor cycles, read operations, as well as energy use, and competes for these resources with end users. Furthermore, brute force scanning is unrelated to the actual change rate in the FS. For example, even if no changes have occurred in the FS, the brute force scan still needs to scan the entire FS to determine that no changes have occurred. Thus, alternatives to brute force scanning have been developed.

One alternative to brute force scanning is block level replication. Block level replication ensures that whenever a sector on a data storage device (e.g., a hard disk drive (HDD)) in the primary FS is modified (e.g., by a write operation or otherwise), it is synchronously copied to an identical data storage device, ideally in a different computer at another site. Block level replication maintains absolute equality between the primary FS and the replica because every time a file is modified it is effectively modified on both copies at the same time. However, block level replication performance is typically poor, because the replica is usually in a different geographical location than the primary. Typically, the latency between a user and the primary FS is in microseconds, while the latency to the replica may be milliseconds or more. Thus, every input/output (I/O) operation needs to wait for the round trip latency, which may reduce the effective performance of the primary FS by an order of magnitude or more.

A second alternative approach to brute force scanning is the use of event notification in file level replication. File level replication is more commonly implemented than block level replication. File level replication approaches use event notification. Event notification involves the replication system registering with the FS to be told about changes that happen in the FS. A change may be, for example, the creation of a file, the deletion of a file, or a modification of a file. Every time a change occurs, an event is generated and distributed to all the processes that have requested notification. The replication system can then respond to these events by replicating the associated file as appropriate.

While file level replication provides improved performance compared to naïve brute force scanning, file level replication still has drawbacks. Synchronously maintaining an absolutely accurate log of every change that has happened in the FS is expensive. Similarly, making sure that all those events are delivered to every process or user that needs to know, even in the face of network delays, slow servers, or other delays, is additionally expensive. In larger file systems, events may be generated at the rate of tens or hundreds of thousands of events per second. Faced with these large numbers of events, existing file level replication approaches typically do not even try to maintain a perfectly accurate log. Existing approaches just try to deliver events using a "best effort", which is to say a user or process consuming events may or may not get an accurate accounting of events for everything that has actually happened in the file system. Thus, reboots, switching networks, network delays, or other actions in the FS environment will cause some events to be lost.

In many situations, "best effort" event notification is not sufficient. Any file which was modified, but for which the modifying event was not recorded, will not get replicated, and thus may be permanently lost if the primary FS fails. Therefore, file level replication approaches typically backstop their event notification by continuing to do brute force scanning at a relatively high interval. Effectively, event notification is used to bridge the gaps between brute force scans, but does not eliminate the scans. For larger file systems with large amounts of data, even relatively infrequent brute force scans may be unacceptably expensive or slow, and may therefore be unacceptable in a production environment.

BRIEF DESCRIPTION OF THE DRAWINGS

The accompanying drawings, which are incorporated in and constitute a part of the specification, illustrate various example systems, apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
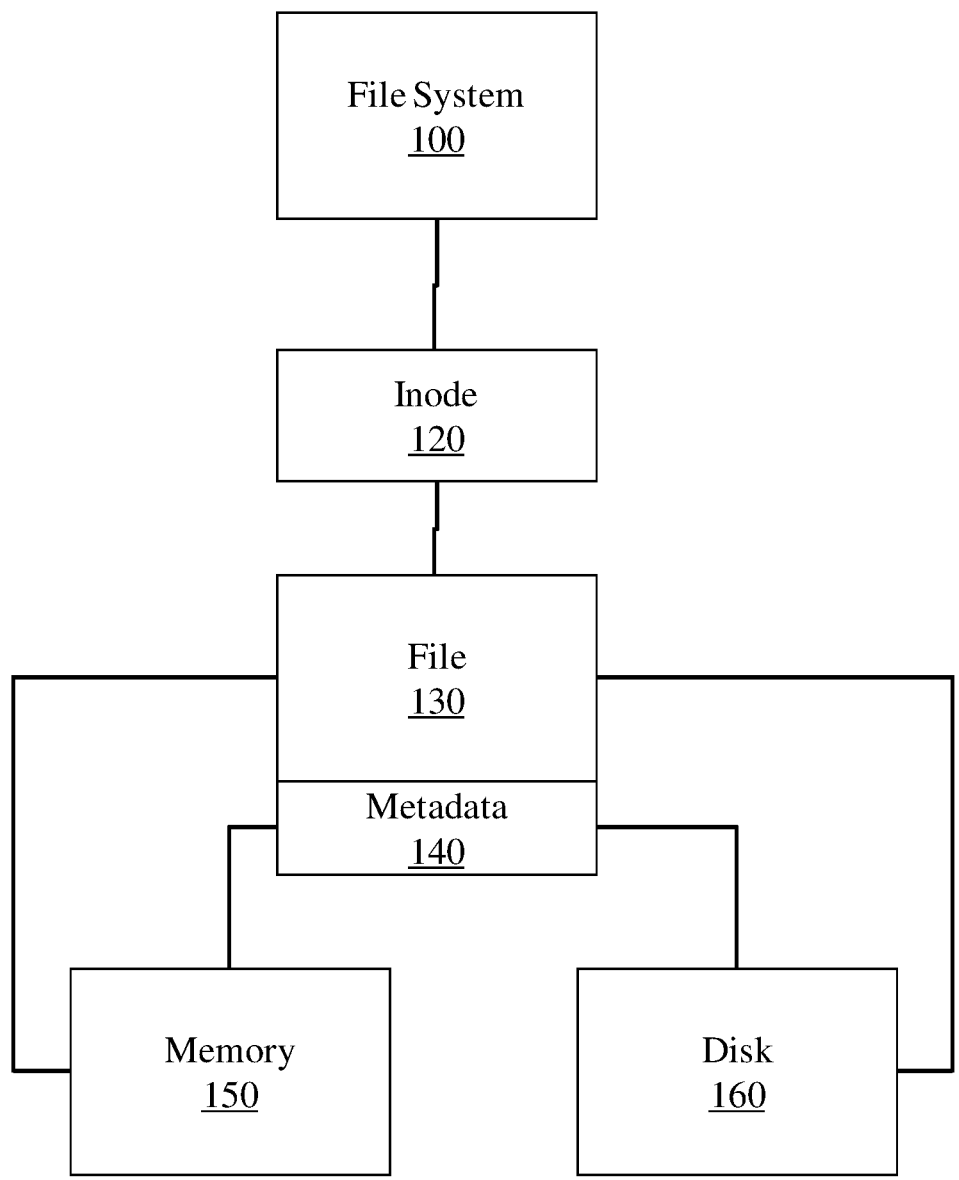
FIG. 1 illustrates a file system.

Embodiments described herein improve on existing file system (FS) replication approaches by employing a metadata archive associated with the FS to provide flexible synchronous replication while avoiding performing scans of the FS in replication. Embodiments may replicate data from a FS in a first location to a replica in a second, different location, from one directory to another within the same file system, or may replicate data from a first file system to a second, different file system on a single client. By reducing the number of scans, including brute force scans, experienced by a FS during replication, reducing the frequency of such scans, or eliminating such scans altogether, the performance of the FS, and the system on which it operates, is improved. A FS may have metadata that describes the contents of the FS. In embodiments described herein, the metadata is stored in a metadata archive managed and updated by the FS journal.

A metadata archive includes a spatial database that captures both the structure of the metadata and the contents of the metadata. The metadata archive is updated in real time, synchronously, by the FS's journal, such that the metadata archive keeps an accurate record of changes in the FS, independent of a replication service. The metadata archive supports spatial queries on the metadata. For example, embodiments may query the metadata archive about a particular directory tree in the FS matching certain criteria. The metadata archive may provide information, in response to the query, about locations in the particular directory tree that are likely to have files that have experienced changes, about files that exist in the FS, about how those files existed in the FS in the past, or about how those files have changed over time. An exemplary metadata archive suitable for use by embodiments described herein is described in U.S. patent application Ser. No. 14/956,553. By reducing the number of scans experienced by a FS during replication, reducing the frequency of scans, or eliminating such scans, the performance of the FS, and the system on which it operates, is improved.

Embodiments avoid scans in replication by querying the metadata archive for information about locations in the FS that include files that have experienced changes. For example, in one embodiment, a synchronous replication service (e.g., FlexSync) may query the metadata archive for changes in a primary directory tree in the FS that is being replicated. The query may specify a time period during which changes may have occurred. For example, the query may specify to search for changes that occurred since the timestamp of the last replication of the primary directory tree. Upon receiving the query, the metadata archive provides an answer to the query to the replication service. In existing approaches, a replication service may query a FS that uses a traditional SQL database using a traditional SQL query for a list of files that have changed. This query may be complex, may take a long time for the SQL database to process, and may result in a response that includes a large amount of data, which will need to be transferred between the FS and the replication service. Unlike in existing approaches, embodiments generate a spatial query and query the metadata archive, which provides a spatial answer that indicates a location in the primary directory tree that includes files that have experienced changes according to the terms of the query. The replication service uses the answer to the query to filter or restrict its scan to only the portions of the primary directory tree that the answer indicates are likely to have experienced changes. Since the metadata archive is updated by the FS itself, it does not provide incorrect information to the replication service. Since the replication service does not maintain the metadata archive (the metadata archive is maintained by the FS itself), the impact of the replication service being offline is minimized: the replication service may query the metadata archive about changes to the FS between some time in the past, and the current time, without concern as to the replication service being offline during that period. Since there is no requirement that there be maintenance of an event stream, unlike in existing event notification approaches, there is no possibility of losing data caused by losing synchronization.

For example, typically in an existing event notification scheme, the events themselves are not persisted. When an event happens, the system broadcasts that to the world, and if a user wanted to know about the event but happened to not be available at that instant (e.g., due to network outage, power failure) the user would not be notified. The existing event notification scheme does not detect that the user was not notified, and does not notify the user later, which would be an expensive and complicated problem to solve using existing approaches. In contrast, embodiments employing a metadata archive do not query events per se, but rather query the state of files in the FS. This state may change over time. Embodiments thus may only need to remember the timestamp at which the file was last replicated, in order to know when to start the query. The metadata archive does not need to remember anything about the synchronous replication service.

Figure 6:
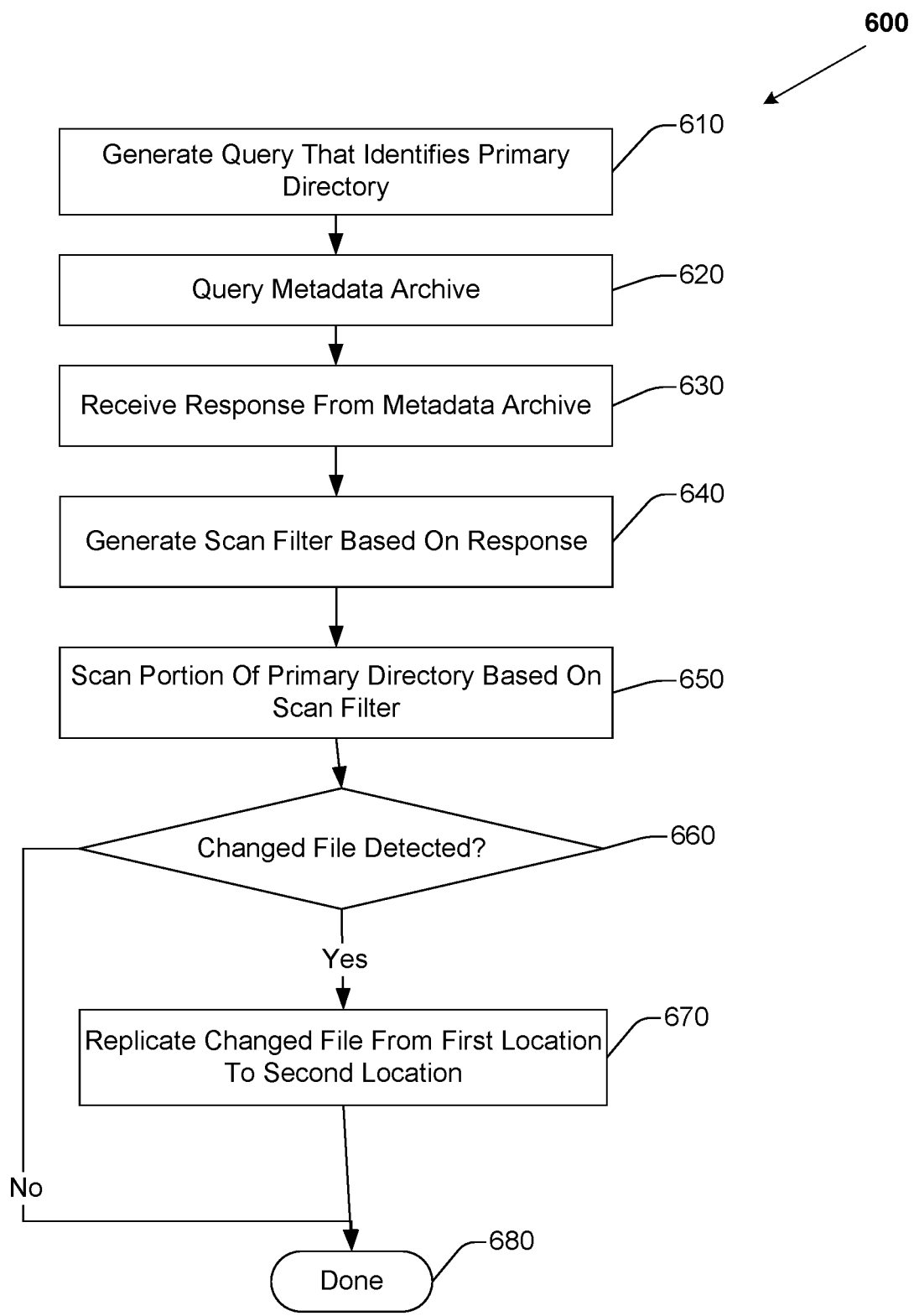
FIG. 6 illustrates an example method for replicating a file system.

FIG. 6 illustrates an example method 600 for synchronizing a tree of files in a FS from a first location to a second, different location. The FS may be implemented as part of a data storage system, including a tiered data storage system. A location may include, for example, different types of data storage apparatus selected from a flash memory apparatus, a solid-state device (SSD) apparatus, a hard disk drive (HDD) apparatus, a tape apparatus, and an object storage (e.g., cloud-based) apparatus, or other electronic data storage device located in a physical location. A FS may include data, including files, and data about the files (i.e., metadata). The FS includes a journal. The FS may include a metadata archive that contains metadata about the FS. The metadata archive includes a spatial database that supports spatial queries on the metadata. The metadata archive is updated synchronously in real time by the FS journal.

Method 600 includes, at 610, generating a query that identifies a primary directory in the FS in which to search for a changed file. Generating the query may include controlling a replication service to generate the query with respect to changes in the FS. The query may be, for example a spatial database query. The replication service generates the query to query the metadata archive associated with the FS for files that have changed in the FS. The query may define parameters or search terms. For example, the query may request information about files that have changed within the primary directory tree since a first time stamp. The first time stamp may be, for example, some time in the past (e.g., 1 second ago, 1 minute ago, 1 hour ago, 1 day ago, 1 month ago, etc.). The query may identify a second time stamp, which identifies a second, different time, thus defining a time window in which to search. The query may thus identify a time window within which to search for a changed file. For example, the query may request information about changed files that changed between two hours ago and one hour ago. In embodiments described herein, the query may include other terms, including terms about which user created a file, modified a file, read a file, a policy related to a file, or other properties of a file stored in the FS. Generating the query may include acquiring electronic data, reading from a computer file, receiving a computer file, reading from a computer memory, or other computerized activity.

Method 600 also includes, at 620, querying the metadata archive with the spatial query generated at 610. Querying the metadata archive may include acquiring electronic data, reading from a computer file, receiving a computer file, reading from a computer memory, or other computerized activity.

In one embodiment, querying the metadata archive includes using Farey sequence encoded information as an index or search term. Since the file names in the metadata archive are encoded using the Farey sequence, spatial relationships between files may be discovered or exploited that may be difficult, if even possible at all, to find in a relational database. For example, ancestry and descendant information may be discovered based on a position within a bounded range of Farey values. Additionally, name similarity may be evaluated based on the proximity of feature vectors to a reference vector. The type of query provided may not be known ahead of time and thus some queries may be delivered through the API, including a web API, provided by the spatial database.

Method 600 also includes, at 630, receiving, from the metadata archive, a response to the query. For example, the response may identify a directory tree that has experienced change within a certain time frame. The response may identify a range of locations within the directory tree that have experienced change. An example response may include, for example, a directory tree such as:
/myfs/data
/myfs/data/projectX
/myfs/data/project
/myfs/data/projectY/newstuff Unlike existing approaches, which may return the entire manifest of everything that has changed in the area of interest (e.g., potentially millions of events), embodiments exchange much less state (e.g., just the range of locations within the directory tree) than existing approaches. Returning just the location in the directory tree where changes have occurred according to the terms of the query requires much less processing and bandwidth than returning the entire manifest of everything that has changed in the primary directory tree. Receiving the response to the query may include acquiring electronic data, reading from a computer file, receiving a computer file, reading from a computer memory, or other computerized activity. In another example, the response may provide other information in response to the query. The metadata archive may be user adjustable such that a user may control the metadata archive to remember a particular amount of history of the FS. For example, the metadata archive may be controlled to record a week of changes, a day of changes, or just to keep track of the current state of the FS. Even if the metadata archive is controlled to keep track of just the current state of the FS, it still maintains information about how old items in the FS are (i.e., when was an item last modified), and thus is able to respond to spatial queries generated at 610.

Description of an exemplary metadata archive suitable for use by embodiments described herein follows. FIG. 1 illustrates a file system 100. While a user may refer to a file 130 using a file name, the file system 100 may refer to the file 130 using an inode 120. When a change is made to the file 130, there may also be a change to the metadata 140 of the file. The metadata 140 may include, for example, the name of a file, the size of a file, the owner of a file, the most recent access time of a file, and other information. In some occurrences, the updated file 130 may be stored in memory 150. Similarly, in some occurrences, the updated metadata 140 may be stored in memory 150. Ultimately, the updated file 130 and the updated metadata 140 may be stored on disk 160. In between the time when the updates are made and the updates are stored to permanent storage (e.g., disk), which is the time while there are changes that have been made only in memory 150, a journal may be used to protect those changes. In one embodiment, some of the metadata 140 for a file 130 may be stored in the inode 120 associated with the file. The inode 120 may also store association metadata (e.g., parent, child) for a file. The association metadata may describe, for example, a parent (e.g., directory) for a file or a descendant (e.g., sub-directory, file) for a directory. The inodes and metadata may be stored in data structures about the files. Thus, file system 100 may have both files and data structures about those files. Example apparatus and methods capture and restore both the structure of the metadata and the contents of the metadata using a spatial database.

Figure 2:
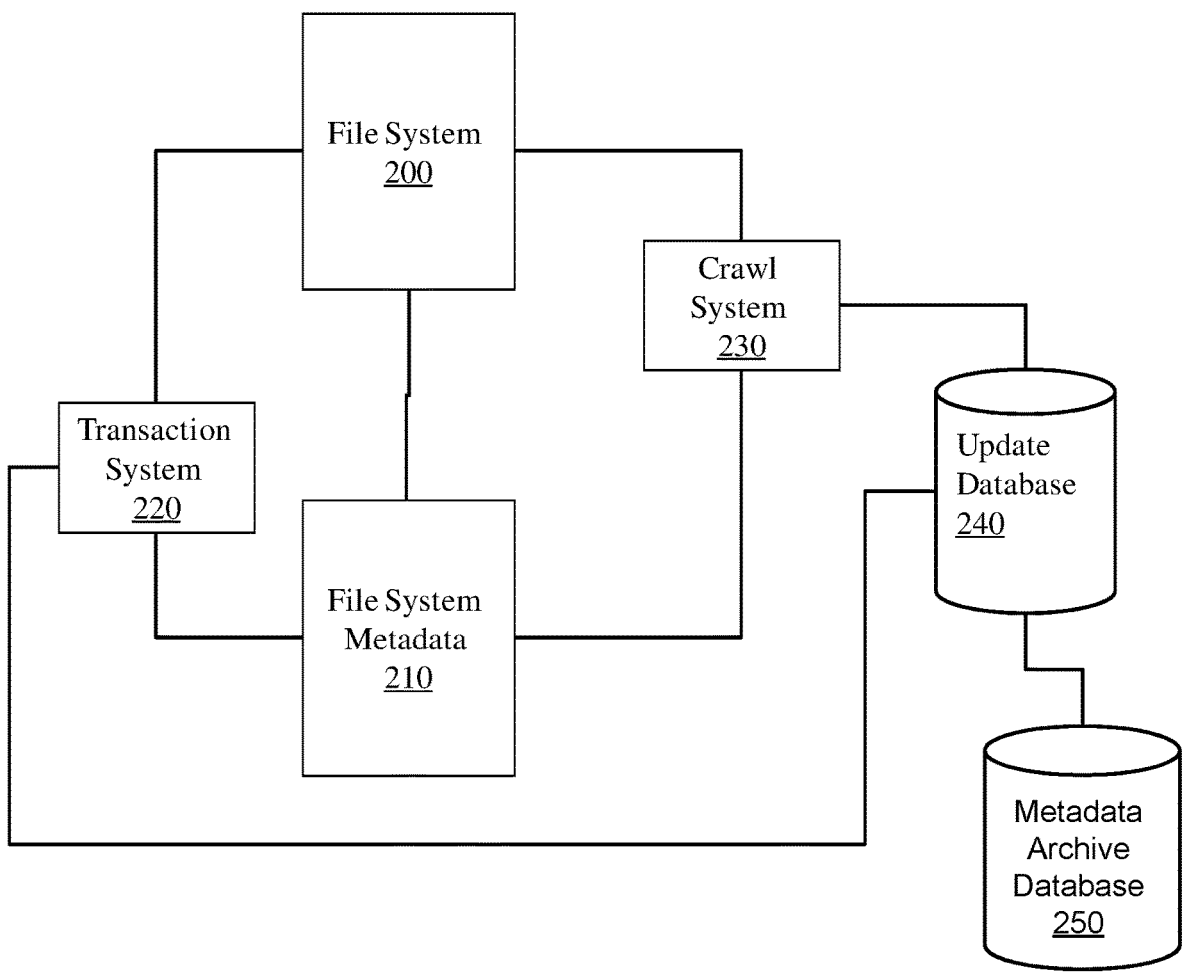
FIG. 2 illustrates an example file system metadata capture system.

FIG. 2 illustrates an example file system metadata capture system. A file system 200 has file system metadata 210. In one embodiment, a mirror of the file system metadata 210 is stored in metadata archive database 250. Rather than write an exact mirror of file system metadata 210 to metadata archive database 250, which would require stopping file system 200 while the metadata 210 was scanned, example systems take a two process and two stage approach. A crawl system 230 systematically moves through the file system 200 or file system metadata 210 to locate and analyze files or inodes. The crawl system 230 may use different approaches including, for example, a depth-first tree walk, a breadth-first search, a combination of searches, or other approaches. The crawl system 230 may identify inodes that are parent inodes and spawn additional threads to search the descendants of the parent. The additional threads may operate in parallel. The crawl system 230 may populate an update database 240 with information discovered in the file system 200 or metadata 210. The crawl system can work while the file system 200 is still operating because changes made to an inode after the crawl system 230 has reported on the inode may be caught by transaction system 220. While a separate metadata archive database 250 is described, in one embodiment, a file system may effectively be the data storage for a file system itself.

Transaction system 220 posts changes to the file system 200 or metadata 210 to the update database 240. The transaction system 220 operates at least partially in parallel with the crawl system 230 and operates while the file system 200 is active. Thus, update database 240 receives both crawler information and transactional information, which facilitates creating and maintaining an up-to-date mirror of the file system metadata 210 in metadata archive database 250. The transaction system 220 may batch up a number (e.g., hundred, thousand, hundred thousand) of transactions before posting the transactions to the update database 240. The update database 240 may therefore be able to collapse, manipulate, or otherwise optimize transactions before posting them to metadata archive database 250. For example, the update database 240 may perform peephole optimization on the batch of transactions or other transactions collected in update database 240. Using the two stage process where information first goes to the update database 240 and then is selectively posted to the metadata archive database 250 facilitates decoupling file system journaling from the application of metadata archive updates, which can remove a file system bottleneck found in conventional one-stage, tightly-coupled systems.

Figure 3:
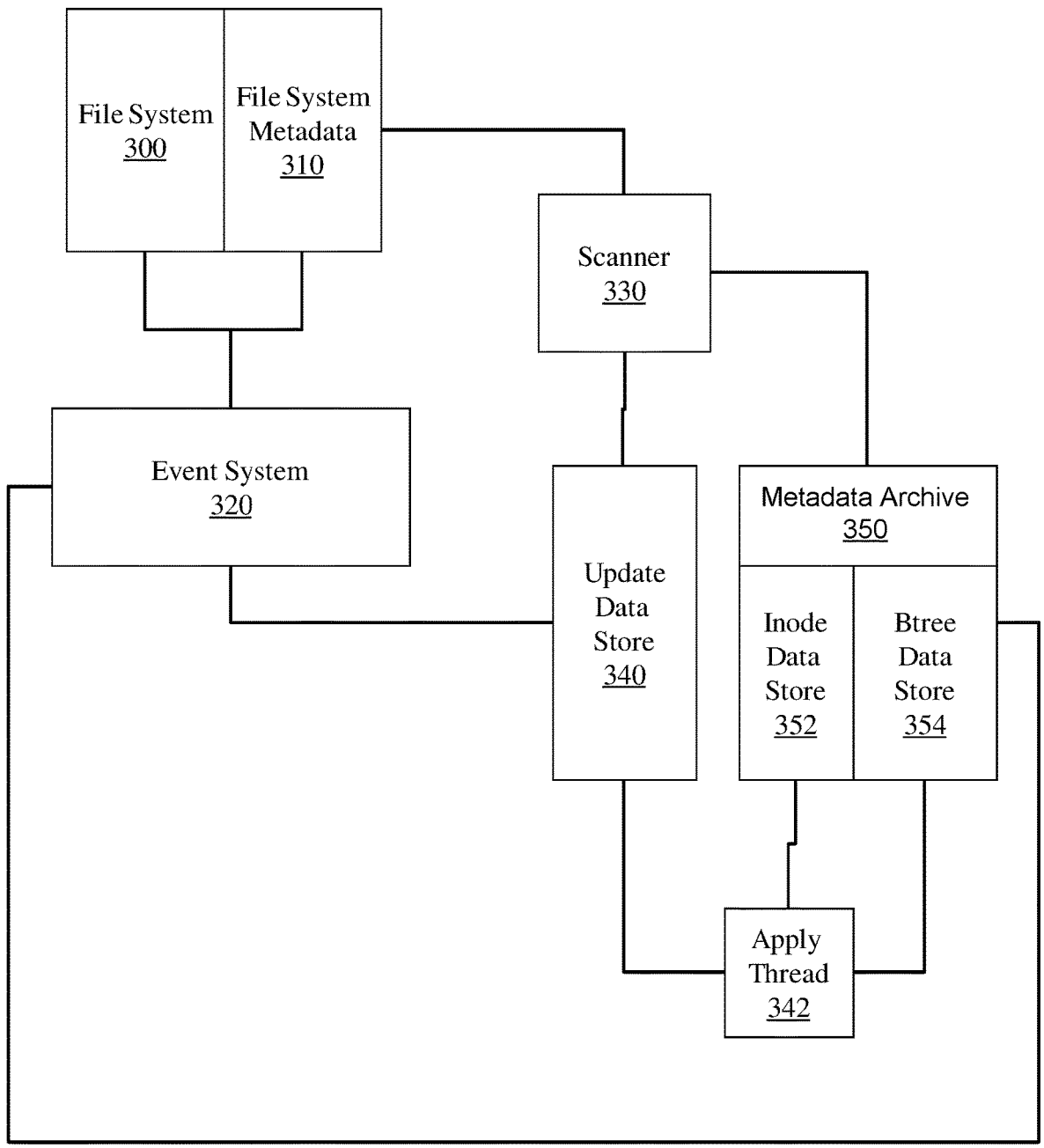
FIG. 3 illustrates an example file system metadata capture and restore system.

FIG. 3 illustrates an example file system metadata capture and restore system. In this embodiment, file system 300 and file system metadata 310 interact with a single scanner 330 and a single event system 320. The scanner 330 may be multi-threaded and may provide both inbound (e.g., create/maintain) services and outbound (e.g., restore) services. The event system 320 may also be multi-threaded and may also provide both inbound and outbound services.

The metadata 310 is stored in a metadata archive 350 that may include multiple database data stores. For example, the metadata archive 350 may include an inode data store 352 that stores information about the structure of file system 300 including its inodes and their relationships. In one embodiment, the file system 300 or the file system metadata 310 may be organized as a set of trees (e.g., btrees). Therefore, the metadata archive 350 may also include a btree data store 354 that stores data from the set of trees. In one embodiment, the metadata archive 350 may be a spatial database and the inode data store 352 and the btree data store 354 may be data stores in the spatial database.

The scanner 330 and event system 320 may populate an update data store 340 during inbound processing (e.g., create/maintain) and may retrieve information from the metadata archive 350 during output processing (e.g., restore). Data may be selectively moved from the update data store 340 to the inode data store 352 or the btree data store 354 by an apply thread 342. The apply thread 342 may perform optimizations (e.g., peephole optimization). "Peephole optimization" refers to analyzing a set of transactions to identify transactions that can be removed due, for example, to later superseding transactions. For example, a file may be "touched" a hundred times in a row without changing any of the contents of the file. However, each touch may change the access time for the file and create a separate file system transaction. Peephole optimization may recognize the hundred touches and realize that only the last touch is relevant and therefore remove the transactions associated with the previous ninety-nine touches. Other such optimizations may also be applied. The apply thread 342 may also be selectively paused to allow the metadata archive 350 to quiesce before, for example, a backup operation.

In one embodiment, writes from the scanner 330 or event system 320 may be asynchronous writes that need to be completed before the data associated with the write is removed from the scanner or event system 320. Similarly, in one embodiment, writes from the apply thread 342 may be asynchronous writes that need to be completed before the data associated with the write is removed. In one embodiment, when the update data store 340, inode data store 352, and btree data store 354 are spatial database data store, writes to the data stores may use a write-ahead log approach.

The inode data store 352 and the btree data store 354 may store information sufficient for restoring file system metadata 310. While inode data store 352 and btree data store 354 provide a mirror of file system metadata 310, the data stores may not be constrained to share the exact format of the structures or hierarchy in file system metadata 310. For example, hierarchical structures or trees in file system metadata 310 may be flattened into structures that preserve the metadata information without being constrained by the metadata organization.

Figure 4:
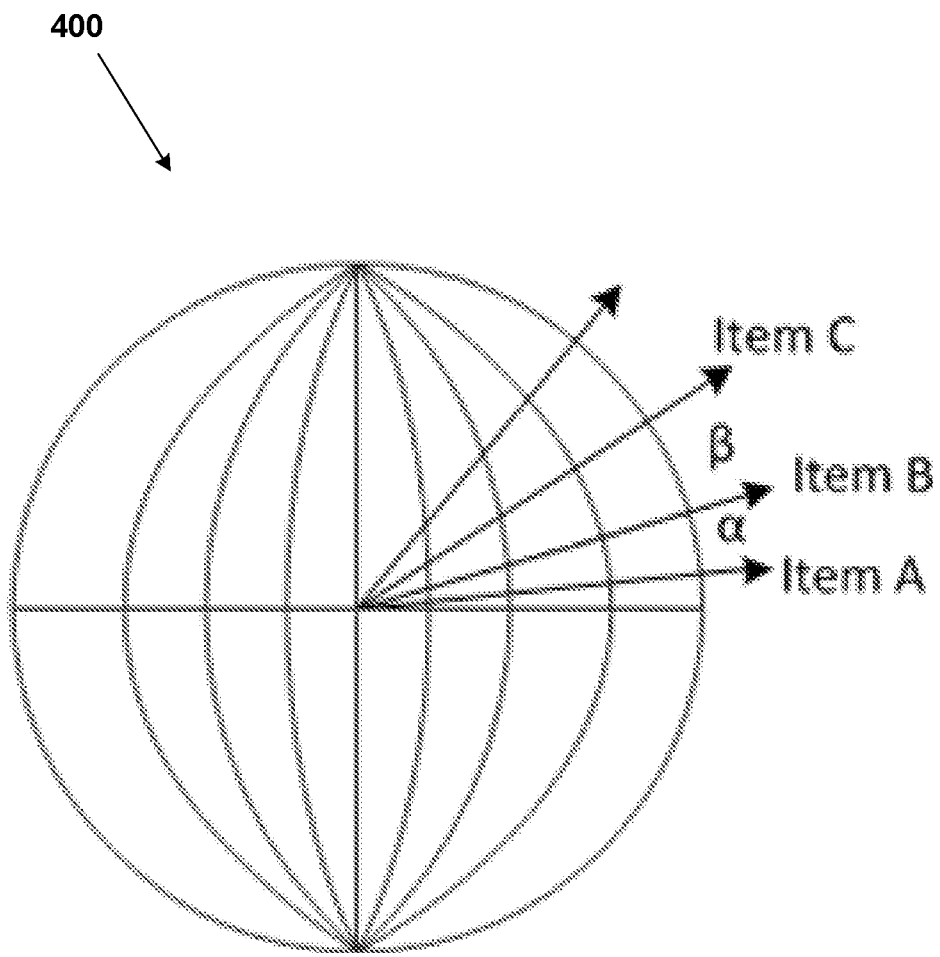
FIG. 4 illustrates example feature vectors associated with an example metadata archive spatial database system.

FIG. 4 illustrates feature vectors associated with a spatial database used for a metadata archive. A spatial database is organized and optimized to store and query data that represents objects that are defined in a geometric space. The concept of Cartesian co-ordinates (e.g., x,y) on a map or graph is familiar. Cartesian co-ordinates are one example of how a location or information can be represented in two dimensions. A vector that starts at the origin of a graph and extends to the x,y location is readily visualized. A two dimensional geometry can also be defined in other ways including, for example, a radius and angle notation. While two dimensional geometries are interesting and useful, a spatial database may handle objects that are represented by a feature vector having more than two features and thus more than two dimensions.

A feature vector is an n-dimensional vector of numerical features that represent an object, in this case a metadata object. Non-numerical data may be converted (e.g., hashed) to a numerical value during feature construction. A feature vector may be similar to a vector associated with an explanatory variable used in a statistical process like linear regression. The vector space associated with a set of vectors may be referred to as a feature space. Higher level features can be constructed from available features and added to a feature vector.

A spatial database can be queried with respect to relationships between objects in ways that are difficult, if even possible at all, for conventional table based SQL databases. The spatial database is used by the metadata archive instead of a conventional relational database. In the spatial database, a metadata object is represented by a feature vector. The features for the vector include, but are not limited to: file inode number, file size, owner, permissions, and location of content on disk/tape.

By using the spatial database instead of a relational database, more efficient queries on various (e.g., any) combinations of features may be performed. For example, a query like "find all files modified yesterday that are at least 1 GB and owned by Steve" may be performed. Queries like this may have been inefficient, if even possible at all, in a conventional relational database approach. In response to such a query, embodiments described herein may receive a response from the metadata archive like "files modified yesterday that are at least 1 GB and owned by Steve are likely to be found in region [x1, xn] of the directory tree(x)".

FIG. 4 illustrates a feature space 400 where the distance between items is defined. For example, the distance between a first vector associated with a first item and a second vector associated with a second item may be measured by angle α and the distance between the second vector and a third vector associated with a third item can be measured by β. The distance between items may describe, for example, the degree of similarity of the items. The items represented by the feature vectors may be, for example, inodes, inode objects, files, or other items. While the distance is illustrated being measured by angles, other distance measuring approaches may be applied. The feature space 400 may have been created by adding feature vectors to the feature space 400. The feature vectors may include features that are encoded from inode information (e.g., inode number, inode state).

Figure 5:
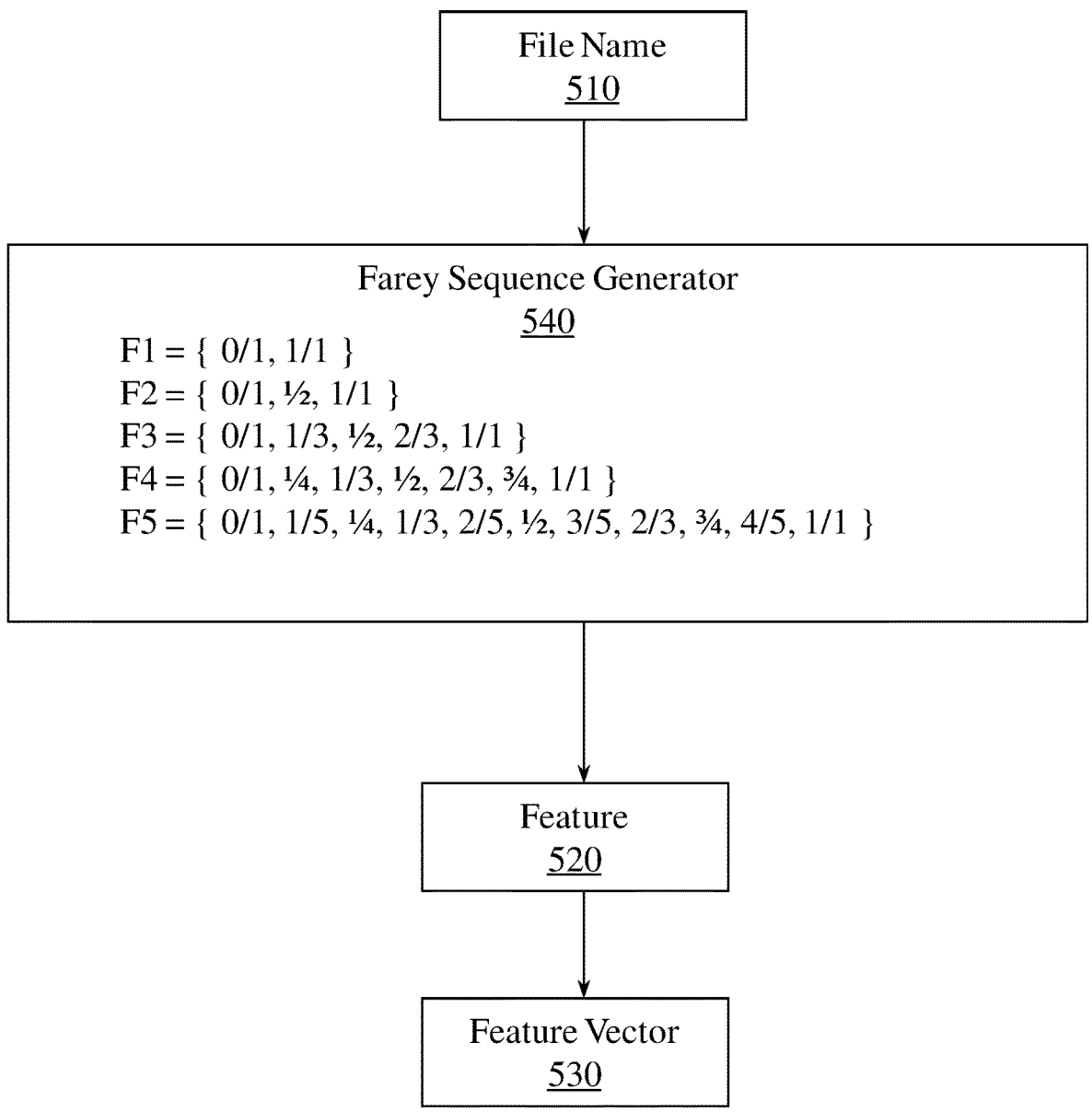
FIG. 5 illustrates using a Farey sequence in an example metadata archive spatial database system.

FIG. 5 illustrates using an example Farey sequence generator 540 to encode a file name 510 in the file system as a rational valued spatial dimension that is used as a feature 520 for the feature vector 530. A Farey sequence of order n is the sequence of completely reduced fractions between 0 and 1 that, when in lowest terms, have denominators less than or equal to n, arranged in order of increasing size. A Farey sequence starts at 0 and ends at 1. The middle term of a Farey sequence is ½. Two neighboring Farey fractions are called a Farey pair. By way of illustration, the Farey sequences of order 1 to 5 are:

F1={0/1, 1/1}
F2={0/1, ½, 1/1}
F3={0/1, ⅓, ½, ⅔, 1/1}
F4={0/1, ¼, ⅓, ½, ⅔, ¾, 1/1}
F5={0/1, ⅕, ¼, ⅓, ⅖, ½, ⅗, ⅔, ¾, ⅘, 1/1}

Using a Farey sequence and assigning an inode to an interval in the sequence based on a file name or hash of a file name allows queries for membership in a directory tree and ancestry in ways that may be difficult, if even possible at all, in a relational database. The query is made possible by encoding the file name or directory path using the sequence to produce a feature for a feature vector. The ancestry of an inode may then be determined by querying on the Farey sequence feature. Descendants of a given inode may be found by identifying inodes having a Farey sequence in a defined interval.

The spatial database for the metadata archive is a spatially indexed metadata database. This facilitates supporting event notification. Users often manage their network file system content with an external content management system. Users may wish to have an application programming interface (API) by which they can efficiently query the file system for changed content in order to keep their content management system current. Specific requirements for how queries will be structured may be unknown, thus example embodiments may provide a query API that allows queries to be built using different combinations of features.

In one embodiment, the spatial database, when new versions of metadata are received by the database from the file system, the old versions of the metadata are not removed. Rather, the transaction identification numbers over which each version of the metadata object existed are recorded. By doing so, the database can produce a view (e.g., snapshot) of the file system at any time point. Additionally, the database can produce a delta (e.g., incremental backup) containing the metadata changes from one point in time to another point in time. Additionally, the database can generate a log (e.g., event notifications) of user level file system changes that occurred over a time window.

Returning to method 600, method 600 also includes, at 640, generating a scan filter. The scan filter is generated based, at least in part, on the response to the query. The scan filter defines a portion of the primary directory tree associated with the identified file to be scanned. The portion of the primary director tree defined by the scan filter is less than the entire primary directory tree. In one embodiment, the scan filter may be further based on additional information about the file system, or additional information returned in response to the query. For example, the replication service may know that, based on the current operating conditions of the FS, that the optimal region to scan for changed files in the directory is smaller than the region provided by the response, or larger than the region provided by the response. The scan filter may be further based on other, different parameters. For example, the scan filter may be further based on the time at which a file in the primary directory tree was most recently modified. In one embodiment, files that have been modified within a threshold period of time (e.g., within the last second, five seconds) may be not be replicated, or may have their replication delayed. In another embodiment, the scan filter may be based on file system permissions associated with files in the primary directory tree.

Method 600 also includes, at 650, scanning a portion of the primary directory tree defined by the scan filter. Scanning the portion of the primary directory tree may include acquiring electronic data, reading from a computer file, receiving a computer file, reading from a computer memory, or other computerized activity. Scanning a portion of the primary directory tree defined by the scan filter does not include tree walking the entire directory tree. In one embodiment, scanning the portion of the primary directory tree defined by the scan filter for a changed file includes walking less than the entire primary directory tree. Embodiments improve on existing approaches by eliminating the need for tree walking the entire directory tree. For example, consider a scan filter based on the primary directory tree:

/myfs/data
/myfs/data/projectX
/myfs/data/project
/myfs/data/projectY/newstuff

In this example, embodiments would walk /myfs but would ignore all the children of /myfs other than "data", since those are not defined by the scan filter.

Method 600 also includes, at 660, determining if a file in the portion of the directory tree defined by the scan filter and scanned by the replication service has changed. Upon determining that a file in the portion of the directory tree defined by the scan filter has changed, method 600 includes, at 670, replicating the changed file to a second, different location. In one embodiment, replicating the changed file includes copying the changed file from the first location in the first data storage device to a second, different location in a second, different data storage device. In another embodiment, replicating the changed file includes copying the changed file from the first location in the first data storage device to a second, different location in the first data storage device. Replicating the changed file may include acquiring electronic data, reading from a computer file, receiving a computer file, reading from a computer memory, or other computerized activity. Upon replicating the changed file, method 600 may, at 680, terminate, or may proceed to search for or replicate other files.

In one embodiment, method 600 may replicate the changed file according to a policy. The policy may define, for example, a replication schedule, a cool-down period, or an environmental condition, and may regulates when replication will occur. In another embodiment, method 600 may replicate the changed file on an ad-hoc basis. For example, a user may control the replication service to replicate the changed file according to a user command.

Embodiments may replicate data between cross-mounted file systems on different storage appliances. In one example, embodiments may replicate data where a client has file systems mounted from different appliances. In one example, embodiments may replicate data where data is moved between appliances over a fibre channel. In one example, embodiments may replicate data between appliances over an IP-based network connection. In still another example, embodiments may replicate data across a network connection to create a remote replica.

In one embodiment, method 600 may replicate the changed file locally. For example, the replication service may replicate the changed file to a different location on the same storage device (e.g., HDD, SSD), or to a different storage device within the same data storage system (e.g., from a first HDD to a second HDD within the same data storage system at the same location). In another embodiment, method 600 may replicate the changed file over a local area network (LAN), over a wide area network (WAN), to the cloud, or to another, different, remote location.

In embodiments in which the changed file is replicated over a network (e.g., LAN, WAN), the replicating the changed file may include applying data compression to the changed file. For example, embodiments may employ delta compression when replicating a changed file over a network. In this embodiment, changed files are individually hashed, block by block, and only changed blocks are transmitted from the first location to the second, different location. Delta compression facilitates efficient transmission of changes to files in the FS, since only changed portions of changed files are transmitted over the network, while full copies are maintained on the source and replica.

In one embodiment, method 600 delays replication of the changed file according to a cool-down period. For example, in some situations, a file to be replicated may be a large file (e.g., a large video file, or a file containing meteorological data). There may be a high probability that the file is still undergoing changes at the time it is detected as having changed. Replicating the file while it is still undergoing changes may waste time, network bandwidth, and computational resources, because the file will need to be replicated again shortly thereafter when the changes are complete. Embodiments may thus pause or delay replication until after a cool down period has passed. The cool down period may be a time period (e.g., 1 second, 10 seconds) that is defined by a policy, or may be defined on the fly based on detected characteristics of the file to be replicated. Thus, in one example, when embodiments detect a large video file as having changed but that is still being written, embodiments may delay or postpone replicating the large video file without risking missing the change, since the metadata archive will update the metadata for that file as changes occur, and the replication service knows that the next time it scans that file for changes, they will have been recorded by the metadata archive.

Figure 7:
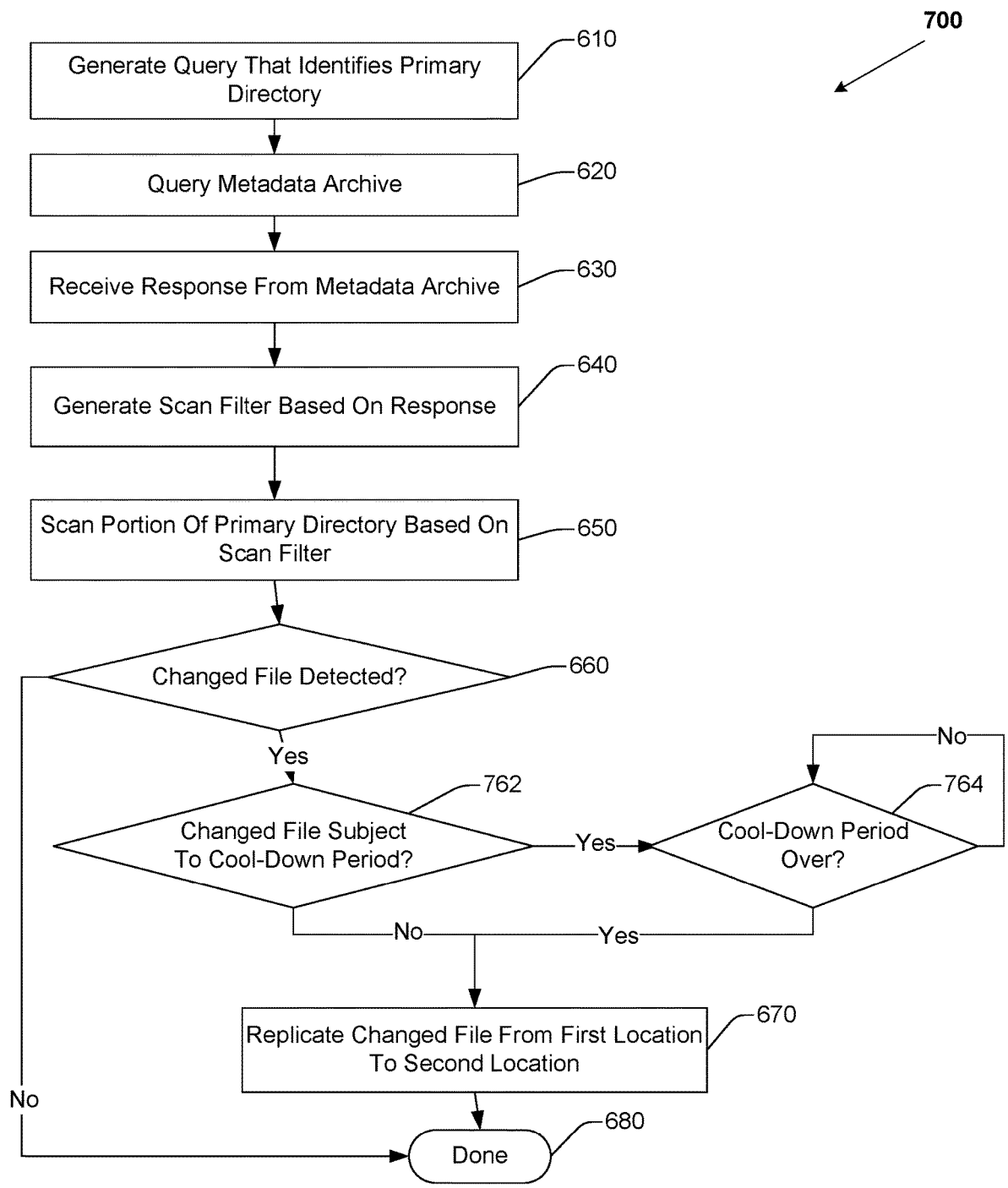
FIG. 7 illustrates an example method for replicating a file system.

FIG. 7 illustrates an example method 700 that is similar to method 600 but that include additional elements and details. Method 700 includes, at 762, determining if a changed file is subject to a cool-down condition. A cool-down condition may include determining if the changed file is still undergoing change (i.e., still being written) at the time of detection, or if the file is of a type that is likely to be still being written at the time of detection. Upon detecting that the changed file is subject to a cool-down condition, method 700 proceeds to determine if, at 764, the cool-down condition has been met. For example, method 700 may determine, at 764, if the file is still being written or if it has been completed. The cool-down condition may specify a time period to wait before checking if the cool-down condition has been met. If the cool-down condition has been met, method 700 proceeds to 670 and replicates the changed file as described with respect to method 600. If the cool-down condition has not been met, in one embodiment, method 700 may wait a threshold period of time (e.g., 0.1 second, 1 second, 10 seconds, 60 seconds, 3600 seconds) and check if the threshold condition has been met again. In another embodiment, method 700 may terminate if the cool-down condition has not been met, or may return to 660 and check again for changed files.

Embodiments described herein facilitate avoiding unnecessary scans of the FS, which has the effect of reducing the number of operations performed by the FS or the storage system in which the FS operates. This reduces wear and tear on storage devices associated with the FS, and improves the energy efficiency and performance of the system compared to existing approaches. For example, while existing approaches may require several hours (e.g., 3-6 hours) to conduct a replication scan in a large data storage system, requiring dedicated clusters of systems to scan constantly, embodiments reduce replication scan times to seconds. Thus, scans may be conducted more frequently, reducing the risk of data loss.

Like numbers refer to like or similar elements throughout the description of the figures. When an element is referred to as being "connected" to another element, it can be directly connected to the other element or intervening elements may be present. In contrast, when an element is referred to as being "directly connected" to another element, there are no intervening elements present. Other words used to describe the relationship between elements should be interpreted in a like fashion (e.g., "between" versus "directly between," "adjacent" versus "directly adjacent," etc.)

In one embodiment, the metadata archive is configured to facilitate restoration of the file system to a historical time point, such as before a failure. The metadata archive may be configured to facilitate recovery of lost or deleted managed files with attributes online. The metadata archive may be configured to facilitate storing and reporting on what has changed in the file system over time. The metadata archive may be configured to facilitate generating deltas for incremental backup. The metadata archive may be configured to facilitate querying for inodes that have data on stripe, or to query for files that may be truncation and store candidates. The metadata archive is configured to access metadata at any time point (i.e., snapshots) or changes between time points. Embodiments employing the metadata archive provide more efficient use of disk performance, including minimizing random I/O, maximizing useful work per IOP, and providing more efficient space utilization, compared to existing approaches.

The metadata archive provides support for composite indexes and spatial indexes on integer, rational, and BLOB/string keys. The metadata archive supports internal automatic sharding for distributed shared nothing design. The metadata archive includes a copy-on-write (COW) log structured design that provides improved I/O performance compared to existing approaches. The metadata archive includes a compressed tablet structure for data files that minimizes I/O and database size on disk compared to existing approaches.

In one embodiment, the metadata archive database is represented as one or more tables. A table may have a predefined set of columns, and a variable number of rows. One column may be chosen as the primary key. The primary key may be immutable, and used for sharding. In this embodiment, the metadata archive provides support for 128-bit rational numbers as a primary data type.

In one embodiment, a table in the metadata archive may have one or more indices. An index specifies a set of columns to be included in the index, and maps a set of column values to row IDs. An index may optionally specify a filter to include only a subset of rows in the index. In one embodiment, an index may be spatial. In another embodiment, an index may be composite.

In one embodiment that employs a composite index, an ordered tuple of a column values is mapped to a row ID. This may be represented as a b-tree. A key order may be required to be known at schema creation time.

In one embodiment that employs a spatial index, an unordered set of column values are mapped to a row ID. This may be represented as an r-tree. The spatial index offers more efficient multiple-column range queries on any combination of included columns that existing SQL non-spatial index-using approaches. The spatial index may index on rational values.

A table in the metadata archive may be represented as N-shards, N being an integer greater than zero. A row of the table is hashed to a shard using the row's primary key. Since the primary key may be immutable, rows never move between shards. A shard has its own thread, cache, and data files. There is thus no contention between shards, and CPU performance is allowed to scale in core count seamlessly, further improving the performance of systems employing embodiments described herein compared to existing approaches.

In one embodiment, database content in the metadata archive is stored in a copy-on-write manner. A transaction creates a new version of the database, where content not modified in the transaction back-references the previous transaction. Any version of the database may be queried until it is ultimately purged. Embodiments allow a writer to modify the database while readers are reading it safely, without lock contention, as a writer only ever reads existing content.

In one embodiment, database contents are written as 4 MB tablet files containing compressed rows of the database content. New or modified content is appended in new tablets. Since database modifications are appending new content to tablets, there is no random write I/O, and no random I/O at all if the database content fits in cache. Old database content may be removed by a garbage collection process, which may also be called "compaction". Without compaction, intermediate states the database has existed in remain represented in the database. Embodiments may expunge old snapshots and reduce the database size. Any object which is not reachable by references from a desired snapshot is considered garbage and may be removed by the compaction process. In one embodiment, all content from the oldest tablet that is still desired is copy-on-write-ed, and then the oldest tablet may be deleted. Compaction may be performed incrementally in the background, or may be performed according to a schedule or policy.

In one embodiment, the metadata archive spatial database schema includes tables for inodes and for btree entries. The schema further includes tables for other metadata objects, including one-off metadata objects including superblocks or other one-off metadata objects. Indices for inodes may include indices for inodes by inodeID, by parent, or by attribute. Composite indices may be employed for high frequency performance of critical operations, including operations used in building the metadata archive, maintaining the metadata archive, and restoring the metadata archive. Spatial indices may be used for lower frequency, more flexible operations, including event notification, policy operations, searching, and other operations. Convenience functions may be employed in C/C++ for other operations, including fetching a version of an inode or btree.

In one embodiment, the metadata archive identifies each file system transaction by a transaction ID (TID). Every inode row and btree row contains a TID range. The TID range represents a life span of that version of the inode or btree. If, at a given time, the version is still extant, then the end of the range is set to a value indicating the version is extant. For example, the end of the range may be set to UINT64_MAX. If the version was created before the metadata archive, then the first TID is set to zero. Embodiments may thus query the metadata archive about the state of the file system as of a given TID by querying inodes and btrees which have TID ranges bracketing the TID of interest (e.g., snapshots). Embodiments may query what changed in the file system between two points in time by querying versions where the first TID or last TID is bracketed by the TID range of interest.

Embodiments may employ the metadata archive to search directory hierarchies. Many use cases for metadata querying involve finding files that match some criteria inside some directory tree. Existing approaches have taken one of two schemes to do this. First, existing approaches may label every inode in the tree with an ID, then index on that ID. This prohibits renaming directories across trees, and requires a priori setup of a label. Searching for a membership in a tree plus some other criteria requires creation of an index on those criteria. This existing approach is thus sub-optimal and results in a restrictive relation point/policy model in the file system. A second existing approach includes performing a tree search from the root of the desired tree. No special setup is required, but the tree search is slow and requires looking at the entire tree to identify relevant matches, even if the number of matches is small compared to the size of the tree.

In contrast to existing approaches, embodiments assign every directory a numeric range [q, r]. Embodiments assign every entry in a directory with a sub-range of its parents' range. To find all files in some directory tree with the range [q, r], embodiments find all files with ranges [q', r'] such that the interval [q', r'] is strictly inside [q, r]. This may be performed using an R-tree directly. Embodiments use rational numbers for the ranges, so that they may be subdivide arbitrarily. Embodiments may use a Farey sequence scheme as described herein. The magnitude of Farey sequence values are linear with respect to the number of nodes in the tree. Embodiments do not require re-labeling existing content as files are added or removed.

Embodiments may query on any directory tree at any time, and do not require predetermining relation points. In a hierarchical storage system a hierarchical storage manager (HSM) may be used to tier files between multiple types of storage (e.g., between disk and tape). An HSM may migrate files between tiers (e.g., between disk and tape) based on a policy. A relation point binds a policy to a directory tree. The relation point indicates to the HSM where to apply a policy. An HSM may implement relation points by physically labeling every directory and file in the directory tree with an identifier: a "relation point ID". An HSM may thus determine if a file is in a relation point by looking at the relation point ID. To indicate that all the files in a directory tree are part of a logical group, an HSM may just label them all the files in the directory tree with a group ID. Existing approaches that identify files as members of a tree by use of a physical ID (e.g., relation point ID) have at least two drawbacks. First, the physical application of the group IDs is expensive, and inherently limits how many groups an inode can be a member of. For example, if a file is a member of one thousand groups, then it needs one thousand group IDs attached to it, which may be inefficient and complicated. Second, a user will need to have decided ahead of time which file trees the user wants to be groups, and to have applied the group IDs before querying. In contrast to existing approaches, embodiments that employ a Farey label scheme label files in such a way as to facilitate querying on any subtree in the file system at any time without any prior arrangements specific to the query. Embodiments further support renames and hard links.

In existing approaches, an inode in the file system has associated with it one reverse path lookup (RPL) and one directory entry. If hard links are present, an inode may have multiple RPLs and multiple directory entries. In contrast, embodiments create a separate version of the inode for every hard link, and include the namespace information into the inode itself. Embodiments thus do not require directory entries or RPLs, just inodes. Embodiments thus allow Farey label and namespace information to be co-located with other attributes on an inode, which improves searching compared to existing approaches.

Figure 8:
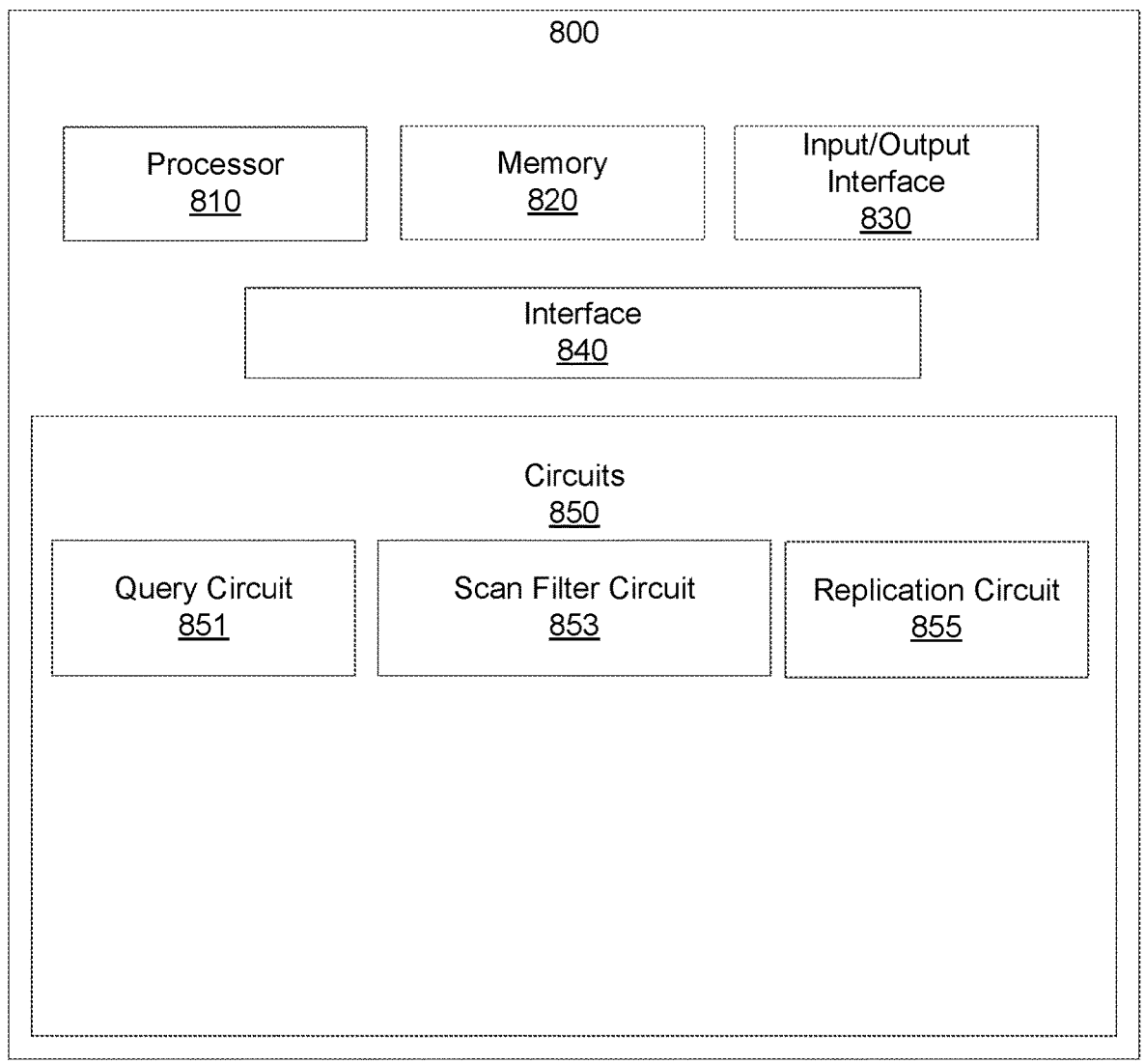
FIG. 8 illustrates an example apparatus configured to replicate a file system.

FIG. 8 illustrates an example apparatus 800 for synchronizing a tree of files from one FS location to another. The FS includes a metadata archive. The metadata archive includes a spatial database. The metadata archive stores metadata about a file stored in the FS in the spatial database. The FS has a journal, and the metadata archive is updated synchronously in real time by the journal. Apparatus 800 may control, or may be implemented as part of, a FS, a data storage system, or a file system replication system. The FS or the data storage system includes at least one data storage device, and may include data storage devices that have different performance properties. For example, in one embodiment, the at least one data storage device may include a tape drive, a hard disk drive (HDD), or a solid-state device (SSD). In another embodiment, the data storage system may include other, different numbers of data storage devices, or other, different types or combinations of types of data storage devices.

Apparatus 800 includes a memory 820 that may store a replication policy. The replication policy may define, for example, a replication schedule, a cool-down condition, or other data protection policy. Apparatus 800 also includes a processor 810, an input/output (I/O) interface 830, a set of circuits 850, and an interface 840 that connects the memory 820, the processor 810, I/O interface 830, and the set of circuits 850.

The set of circuits 850 includes a query circuit 851, a scan filter circuit 853, and a replication circuit 855. Query circuit 851 is configured to generate, a spatial query that identifies a primary directory tree in the FS in which to search for a changed file. Query generation circuit 851 generates the query based, at least in part, on the replication policy. Query generation circuit 851 is further configured to receive a response to the query from the FS. The response identifies a range of the primary directory tree in which a changed file is likely to be found.

Scan filter circuit 853 is configured to generate a scan filter based, at least in part, on the response. The scan filter defines a portion of the primary directory tree to search for a changed file. The portion of the primary directory tree is smaller than the primary directory tree.

Replication circuit 855 is configured to scan the portion of the primary directory tree defined by the scan filter for a changed file. In one embodiment, scanning the portion of the primary directory tree defined by the scan filter for a changed file includes walking less than the entire primary directory tree. Replication circuit 855 is also configured to, upon detecting a changed file, replicate the changed file from the first location to a second, different location.

In one embodiment, replication circuit 855 is configured such that replicating the changed file from the first location to a second, different location includes copying the changed file from the first location in a first data storage device to a second, different location in the first data storage device. In another embodiment, replication circuit 855 is configured such that replicating the changed file from the first location to a second, different location includes copying the changed file from the first location in the first data storage device to a second, different location in a second, different data storage device.

Figure 9:
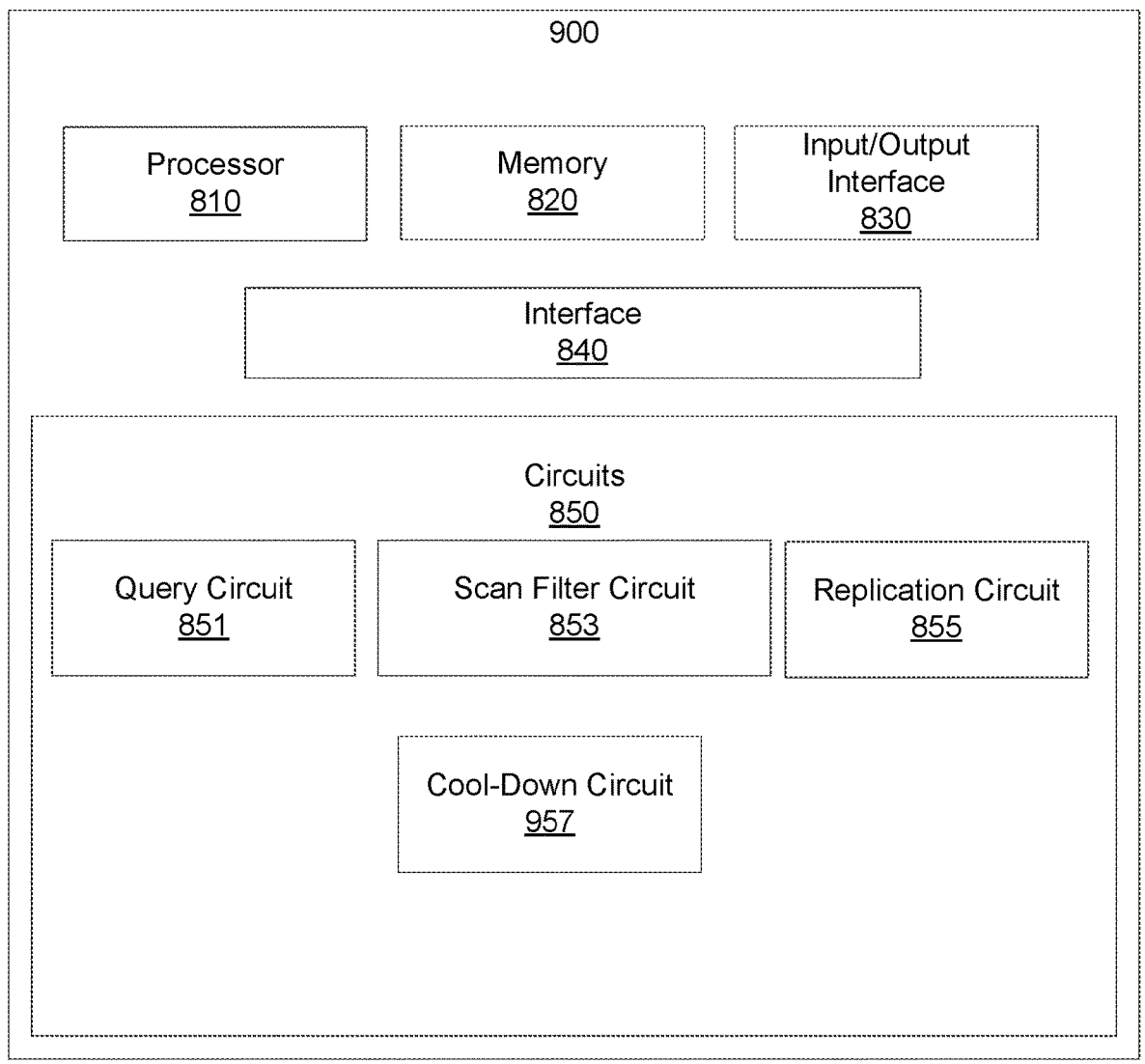
FIG. 9 illustrates an example apparatus configured to replicate a file system.

FIG. 9 illustrates an example apparatus 900 that is similar to apparatus 800 but that includes additional details and elements. In apparatus 900, the set of circuits 850 further includes a cool-down circuit 957. Cool-down circuit 957 is configured to, upon the replication circuit detecting a changed file, detect if the changed file is subject to a cool-down condition. Cool-down circuit 957 is also configured to, upon detecting that the changed file is subject to a cool-down condition, determine if the cool-down condition has been met. Cool-down circuit 957 is further configured to, upon detecting that the cool-down condition has been met, control the replication circuit 855 to replicate the changed file from the first location to a second, different location.

One example embodiment includes a computer-readable storage device storing computer-executable instructions that, in response to execution, cause a replication system, a file system management system, or a processor, to perform operations. The operations may include generating a spatial query that identifies a primary directory tree in an FS in which to search for a changed file. The FS stores a file in a first location in a first data storage device. The FS includes a metadata archive. The metadata archive includes a spatial database. The metadata archive stores metadata about a file stored in the FS in the spatial database. The FS has a journal, and the metadata archive is updated synchronously in real time by the journal. In one embodiment, the metadata archive includes an inode data store and a btree data store. The inode data store stores inode numbers and information from which the structure of the one or more btrees can be reconstructed, and the btree data store stores data from which the contents of the one or more btrees can be reconstructed. In one embodiment, the query that identifies the primary directory tree in the FS in which to search for a changed file further identifies a time window within which search for a changed file.

A replication system, a file system management system, or a processor may include circuitry such as, but not limited to, one or more single-core or multi-core processors. A processor(s) may include any combination of general-purpose processors and dedicated processors (e.g., graphics processors, application processors, etc.). The processors may be coupled with or may include memory or storage and may be configured to execute instructions stored in the memory or storage to enable various apparatus, applications, or operating systems to perform the operations. The memory or storage devices may include main memory, disk storage, or any suitable combination thereof. The memory or storage devices may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The operations further include querying the metadata archive with the query. Querying the metadata archive may include acquiring electronic data, reading from a computer file, receiving a computer file, reading from a computer memory, or other computerized activity. In one embodiment, querying the metadata archive includes querying the metadata archive using Farey sequence encoded information as an index.

The operations further include receiving a response to the query from the metadata archive. The response indicates a portion of the primary directory tree in which a changed file is likely to be found. Receiving the response may include acquiring electronic data, reading from a computer file, receiving a computer file, reading from a computer memory, or other computerized activity.

The operations further include generating a scan filter based, at least in part, on the response. The scan filter defines a portion of the primary directory tree to search for a changed file. The portion of the primary directory tree is smaller than the primary directory tree.

The operations further include scanning the portion of the primary directory tree defined by the scan filter for a changed file. Scanning the primary directory tree may include acquiring electronic data, reading from a computer file, receiving a computer file, reading from a computer memory, or other computerized activity. In one embodiment, scanning the portion of the primary directory tree defined by the scan filter for a changed file includes scanning less than the entire primary directory tree.

The operations further include upon detecting a changed file: replicating the changed file to a second, different location. In one embodiment, replicating the changed file to a second different location includes copying the changed file from the first location in the first data storage device to a second, different location in the first data storage device. In another embodiment, replicating the changed file to a second different location includes copying the changed file from the first location in the first data storage device to a second, different location in a second, different data storage device.

In one embodiment, the operations further include determining if the changed file is subject to a cool-down condition. Upon detecting that the changed file is subject to a cool-down condition, the operations further include determining if the cool-down condition has been met. Upon detecting that the cool-down condition has been met, the operations include replicating the changed file from the first location to a second, different location as described herein.

Figure 10:
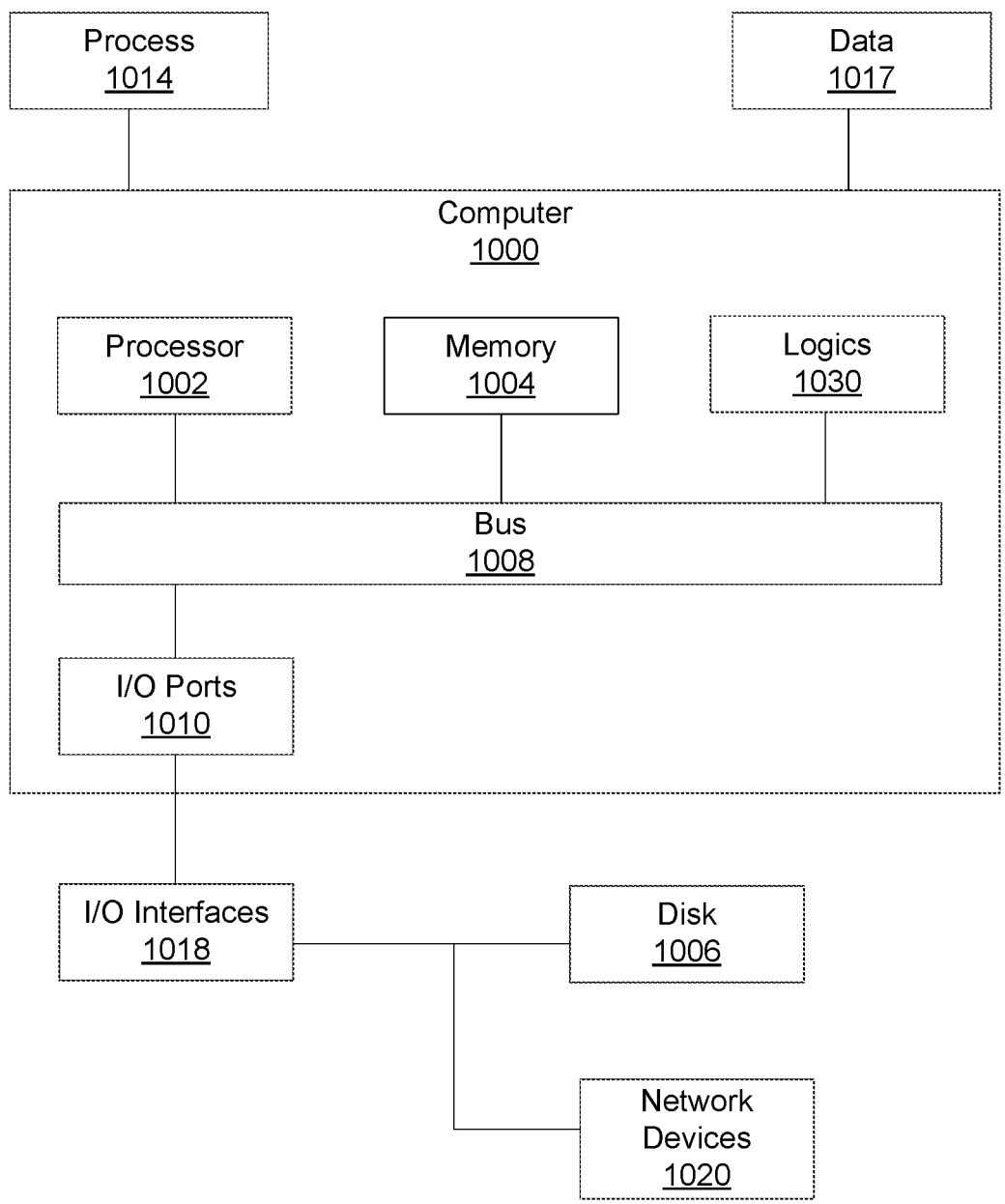
FIG. 10 illustrates an example computer in which example embodiments may operate.

FIG. 10 illustrates an example computer 1000 in which example methods illustrated herein, including methods 600, or 700, can operate and in which example circuits, methods, operations, and apparatus may be implemented. In different examples, computer 1000 may be part of a file system replication system, a shared file system, a data storage system, may be operably connectable to a file system replication system, a shared file system, or data storage system, or may be part of a cloud data storage system.

Computer 1000 includes a processor 1002, a memory 1004, and input/output ports 1010 operably connected by a bus 1008. In one example, computer 1000 may include a set of logics 1030 that perform a method of replicating data in a file system (FS) located in a first location. Thus, the set of logics 1030, whether implemented in computer 1000 as hardware, firmware, and/or a combination thereof may provide means (e.g., hardware, firmware, circuits) for replicating data in an FS located in a first location to a second, different location, without walking the entire primary directory tree in which the data to be replicated is stored. In different examples, the set of logics 1030 may be permanently and/or removably attached to computer 1000.

Processor 1002 can be a variety of various processors including dual microprocessor and other multi-processor architectures. Memory 1004 can include volatile memory and/or non-volatile memory. A disk 1006 may be operably connected to computer 1000 via, for example, an input/output interface (e.g., card, device) 1018 and an input/output port 1010. Disk 1006 may include, but is not limited to, devices like a magnetic disk drive, a tape drive, a Zip drive, a flash memory card, or a memory stick. Furthermore, disk 1006 may include optical drives like a CD-ROM or a digital video ROM drive (DVD ROM). Memory 1004 can store processes 1014 or data 1017, for example. Disk 1006 or memory 1004 can store an operating system that controls and allocates resources of computer 1000.

Bus 1008 can be a single internal bus interconnect architecture or other bus or mesh architectures. While a single bus is illustrated, it is to be appreciated that computer 1000 may communicate with various devices, logics, and peripherals using other buses that are not illustrated (e.g., PCIE, SATA, Infiniband, 1394, USB, Ethernet).

Computer 1000 may interact with input/output devices via I/O interfaces 1018 and input/output ports 1010. Input/output devices can include, but are not limited to, a keyboard, a microphone, a pointing and selection device, cameras, video cards, displays, disk 1006, network devices 1020, or other devices. Input/output ports 1010 can include but are not limited to, serial ports, parallel ports, or USB ports.

Computer 1000 may operate in a network environment and thus may be connected to network devices 1020 via I/O interfaces 1018 or I/O ports 1010. Through the network devices 1020, computer 1000 may interact with a network. Through the network, computer 1000 may be logically connected to remote computers. The networks with which computer 1000 may interact include, but are not limited to, a local area network (LAN), a wide area network (WAN), or other networks. For example, computer 1000 may be operably connected to and interact with a file system, a data storage system, a file system replication system, or a cloud storage system that operates as a tier for a multi-tier data storage system.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods and operations may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not-illustrated blocks.

In one example, a method may be implemented as computer-executable instructions. Thus, in one example, a computer-readable storage device may store computer-executable instructions that if executed by a machine (e.g., processor) cause the machine to perform method 600 or 700. While executable instructions associated with method 600 or 700 are described as being stored on a non-transitory computer-readable storage device, it is to be appreciated that executable instructions associated with other example methods described herein may also be stored on a non-transitory computer-readable storage device.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable storage medium" or "computer-readable storage device" as used herein, refers to a non-transitory medium that stores instructions and/or data. "Computer-readable storage medium" or "computer-readable storage device" does not refer to propagated signals, per se. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium or computer-readable storage device may include, but are not limited to, a floppy disk, a flexible disk, a hard disk, a magnetic tape, a solid-state device (SSD) a shingled magnetic recording (SMR) device, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Circuit", as used herein, includes but is not limited to hardware, or firmware, and/or combinations of each to perform a function(s) or an action(s), and/or to cause a function or action from another logic, method, and/or system. A circuit may include, for example, a discrete logic (e.g., ASIC), an analog circuit, a digital circuit, a programmed logic device, or a memory device containing instructions. A circuit may include one or more gates, combinations of gates, or other circuit components. Where multiple circuits are described, it may be possible to incorporate the multiple circuits into one circuit. Similarly, where a single circuit is described, it may be possible to distribute that single circuit between multiple circuits.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, circuits, computers or other devices, or combinations of these.

While example methods, apparatus, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable storage device storing computer-executable instructions that when executed by a computer cause the computer to perform a method for replicating data in a file system (FS) that stores a file in a first location in a first data storage device, the method comprising:
    generating a query that identifies a primary directory tree in the FS, where the FS includes a metadata archive, where the metadata archive includes a spatial database, and where the metadata archive stores metadata about the file stored in the FS in the spatial database;
    querying the metadata archive with the query;
    receiving a response to the query from the metadata archive, where the response indicates a range of the primary directory tree in which a changed file may be found;
    generating a scan filter based, at least in part, on the response to the query from the metadata archive, where the scan filter defines a portion of the primary directory tree to search for a changed file, where the portion of the primary directory tree is smaller than the primary directory tree;
    scanning the portion of the primary directory tree defined by the scan filter for a changed file; and
    upon detecting a changed file:
        replicating the changed file from the first location to a second, different location.

2. The non-transitory computer-readable storage device of claim 1, where scanning the portion of the primary directory tree defined by the scan filter for a changed file includes walking less than the entire primary directory tree.

3. The non-transitory computer-readable storage device of claim 1, where the FS has a journal, and where the metadata archive is updated synchronously in real time by the journal.

4. The non-transitory computer-readable storage device of claim 1, where the query that identifies the primary directory tree in the FS is a spatial query.

5. The non-transitory computer-readable storage device of claim 1, where the query that identifies the primary directory tree in the FS further identifies a time window within which to search for a changed file.

6. The non-transitory computer-readable storage device of claim 1, where querying the metadata archive includes querying the metadata archive using Farey sequence encoded information as an index.

7. The non-transitory computer-readable storage device of claim 1, where replicating the changed file includes copying the changed file from the first location in the first data storage device to a second, different location in a second, different data storage device.

8. The non-transitory computer-readable storage device of claim 1, where replicating the changed file includes copying the changed file from the first location in the first data storage device to a second, different location in the first data storage device.

9. The non-transitory computer-readable storage device of claim 1, the method further comprising:
    upon detecting that the changed file is subject to a cool-down condition:
        upon detecting that the cool-down condition has been met:
            replicating the changed file from the first location to a second, different location.

10. A non-transitory computer-readable storage device storing computer-executable instructions that in response to execution cause a file system replication system to perform operations, the operations comprising:
    generating a spatial query that identifies a primary directory tree in a file system (FS) in which to search for a changed file, where the FS stores a file in a first location in a first data storage device, where the FS includes a metadata archive, where the metadata archive includes a spatial database, and where the metadata archive stores metadata about a file stored in the FS in the spatial database;
    querying the metadata archive with the spatial query;
    receiving a response to the spatial query from the metadata archive, where the response indicates a range of the primary directory tree in which a changed file may be found;
    generating a scan filter based, at least in part, on the response to the spatial query from the metadata archive, where the scan filter defines a portion of the primary directory tree to search for a changed file, where the portion of the primary directory tree is smaller than the primary directory tree;
    scanning the portion of the primary directory tree defined by the scan filter for a changed file; and
    upon detecting a changed file:
        replicating the changed file to a second, different location.

11. The non-transitory computer-readable storage device of claim 10, where scanning the portion of the primary directory tree defined by the scan filter for a changed file includes scanning less than the entire primary directory tree.

12. The non-transitory computer-readable storage device of claim 10, where the FS has a journal, and where the metadata archive is updated synchronously in real time by the journal.

13. The non-transitory computer-readable storage device of claim 10, where the query that identifies the primary directory tree in the FS in which to search for a changed file further identifies a time window within which search for a changed file.

14. The non-transitory computer-readable storage device of claim 10, where querying the metadata archive includes querying the metadata archive using Farey sequence encoded information as an index.

15. The non-transitory computer-readable storage device of claim 10, where replicating the changed file to a second different location includes copying the changed file from the first location in the first data storage device to a second, different location in the first data storage device, or copying the changed file from the first location in the first data storage device to a second, different location in a second, different data storage device.

16. The non-transitory computer-readable storage device of claim 10, the operations further comprising:
    upon detecting that the changed file is subject to a cool-down condition:
        upon detecting that the cool-down condition has been met:
            replicating the changed file from the first location to a second, different location.

17. An apparatus for replicating a file system (FS) that stores a file in a first location in a first data storage device, the apparatus comprising:
- a memory configured to store a replication policy;
- a processor;
- a set of circuits; and
- an interface that connects the memory, the processor, and the set of circuits, the set of circuits comprising:
    - a query circuit configured to generate a spatial query that identifies a primary directory tree in the FS in which to search for a changed file, where the query circuit generates the spatial query based, at least in part, on the replication policy, and
    - where the query circuit is further configured to receive a response to the spatial query from the FS, where the response identifies a range of the primary directory tree in which a changed file may be found;
    - a scan filter circuit configured to:
    - generate a scan filter based, at least in part, on the response to the spatial query, where the scan filter defines a portion of the primary directory tree to search for a changed file, where the portion of the primary directory tree is smaller than the primary directory tree; and
    - a replication circuit configured to:
        - scan the portion of the primary directory tree defined by the scan filter for a changed file, and
        - upon detecting a changed file:
            - replicate the changed file from the first location to a second, different location.

18. The apparatus of claim 17, where scanning the portion of the primary directory tree defined by the scan filter for a changed file includes walking less than the entire primary directory tree.

19. The apparatus of claim 17, where replicating the changed file from the first location to a second, different location includes copying the changed file from the first location in the first data storage device to a second, different location in the first data storage device, or copying the changed file from the first location in the first data storage device to a second, different location in a second, different data storage device.

20. The apparatus of claim 17, the set of circuits further comprising a cool-down circuit configured to:
- upon the replication circuit detecting a changed file:
    - detect if the changed file is subject to a cool-down condition; and
    - upon detecting that the changed file is subject to a cool-down condition:
        - upon detecting that the cool-down condition has been met:
            - controlling the replication circuit to replicate the changed file from the first location to a second, different location.

* * * * *